United States Patent
Kiriyama et al.

(10) Patent No.: US 6,493,025 B1
(45) Date of Patent: *Dec. 10, 2002

(54) IMAGE SENSING SYSTEM EQUIPPED WITH INTERFACE BETWEEN IMAGE SENSING APPARATUS AND COMPUTER MACHINERY

(75) Inventors: Yoshinari Kiriyama, Gifu-ken (JP); Hiromitsu Niwa, Ogaki (JP)

(73) Assignee: Sanyo Electronic Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/725,353

(22) Filed: Oct. 3, 1996

(30) Foreign Application Priority Data

| Oct. 5, 1995 | (JP) | 7-259029 |
| Oct. 5, 1995 | (JP) | 7-259030 |
| Oct. 5, 1995 | (JP) | 7-259031 |

(51) Int. Cl.[7] .............................. H04N 7/00; H04N 5/76
(52) U.S. Cl. ............................... 348/207.1; 348/231.99
(58) Field of Search ................................. 348/552, 207, 348/231, 232; 369/60; 386/90–91

(56) References Cited

U.S. PATENT DOCUMENTS

| 5,083,208 A | * | 1/1992 | Hatanaka | 358/227 |
| 5,311,331 A | * | 5/1994 | Cha | 358/501 |
| 5,459,508 A | * | 10/1995 | Fuskushima | 348/243 |
| 5,479,206 A | * | 12/1995 | Ueno et al. | 348/211 |
| 5,506,617 A | * | 4/1996 | Parulski et al. | 348/207 |
| 5,568,192 A | * | 10/1996 | Hannah | 348/222 |
| 5,585,856 A | * | 12/1996 | Nakaya et al. | 348/441 |
| 5,604,537 A | * | 2/1997 | Yamazaki et al. | 348/350 |
| 5,631,701 A | * | 5/1997 | Miyake | 348/222 |
| 5,708,637 A | * | 1/1998 | Umemura et al. | 369/60 |
| 5,740,303 A | * | 4/1998 | Ban | 386/35 |
| 5,784,099 A | * | 7/1998 | Lippincott | 348/552 |
| 5,821,994 A | * | 10/1998 | Tani | 348/207 |
| 5,914,728 A | * | 6/1999 | Yamagishi et al. | 345/507 |
| 6,300,976 B1 | * | 10/2001 | Fukuoka | 348/232 |

* cited by examiner

Primary Examiner—Wendy R. Garber
Assistant Examiner—Jacqueline Wilson
(74) Attorney, Agent, or Firm—Sheridan Ross P.C.

(57) ABSTRACT

An image sensing system which includes an image sensing device, a driver, a timing controller, an analog signal processor, an A/D converter, a digital signal processor, a line memory circuit, and an interface controller. The image sensing device has a matrix of light-receiving pixels for receiving light reflected from a target object. The light-receiving pixels produce and retain information charges. The driver produces vertical and horizontal scan timings which cause the image sensing device to produce an analog image signal in proportion to an amount of information charges retained in the light-receiving pixels. The analog image signal is output from the image sensing device line-by-line. The line memory is connected to the digital signal processor for continuously storing the image data line-by-line. The components of the image sensing system are divided between a camera unit and the computer machinery. A camera unit includes the image sensing device, the driver, the timing controller, the analog signal processor, and A/D converter while the computer machinery includes the digital signal processor, the line memory circuit and the interface controller.

9 Claims, 10 Drawing Sheets (read odd-numbered line)

| D(n) | G+Cy | W+Ye | G+Cy | W+Ye | G+Cy | W+Ye | G+Cy |

(read even-numbered line)

| D(n) | W+Cy | G+Ye | W+Cy | G+Ye | W+Cy | G+Ye | W+Cy |

(read odd-numbered line)

| D(n) a | G+Cy | W+Ye | G+Cy | W+Ye | G+Cy | W+Ye | G+Cy |
|---|---|---|---|---|---|---|---|
| D(n) b | W+Cy | G+Ye | W+Cy | G+Ye | W+Cy | G+Ye | W+Cy |
| D(n) c | G+Cy | W+Ye | G+Cy | W+Ye | G+Cy | W+Ye | G+Cy |

(read even-numbered line)

| D(n) a | W+Cy | G+Ye | W+Cy | G+Ye | W+Cy | G+Ye | W+Cy |
|---|---|---|---|---|---|---|---|
| D(n) b | G+Cy | W+Ye | G+Cy | W+Ye | G+Cy | W+Ye | G+Cy |
| D(n) c | W+Cy | G+Ye | W+Cy | G+Ye | W+Cy | G+Ye | W+Cy |

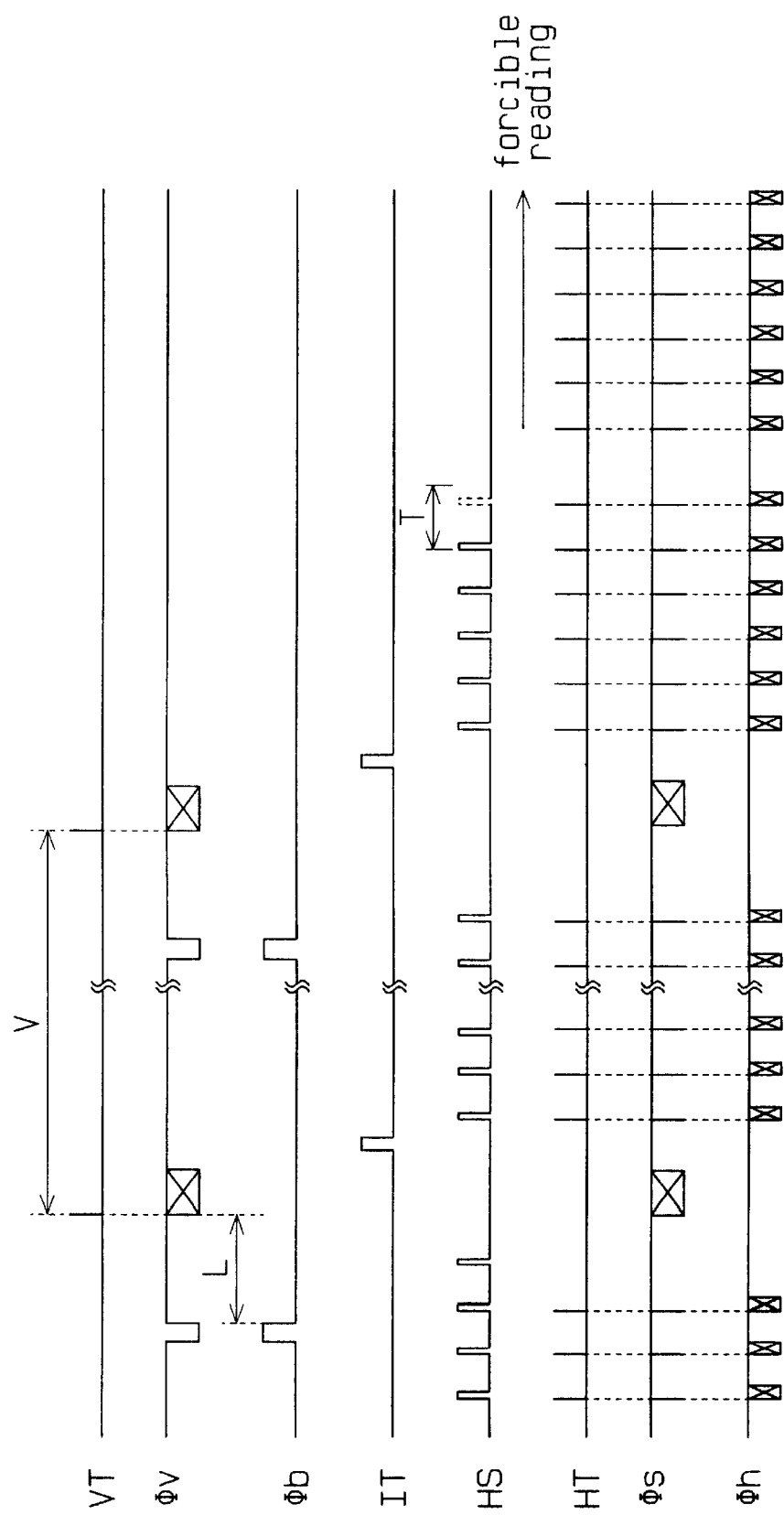

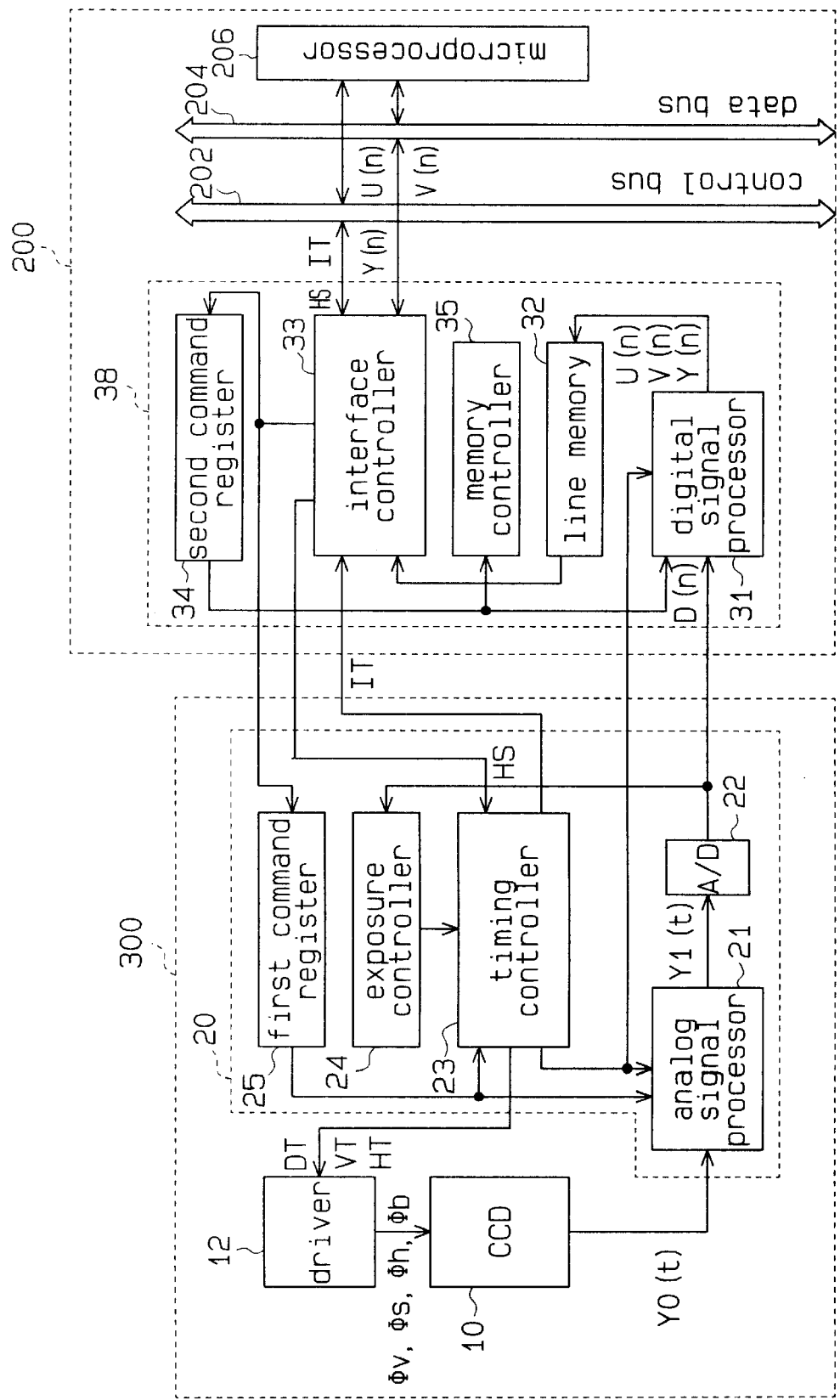

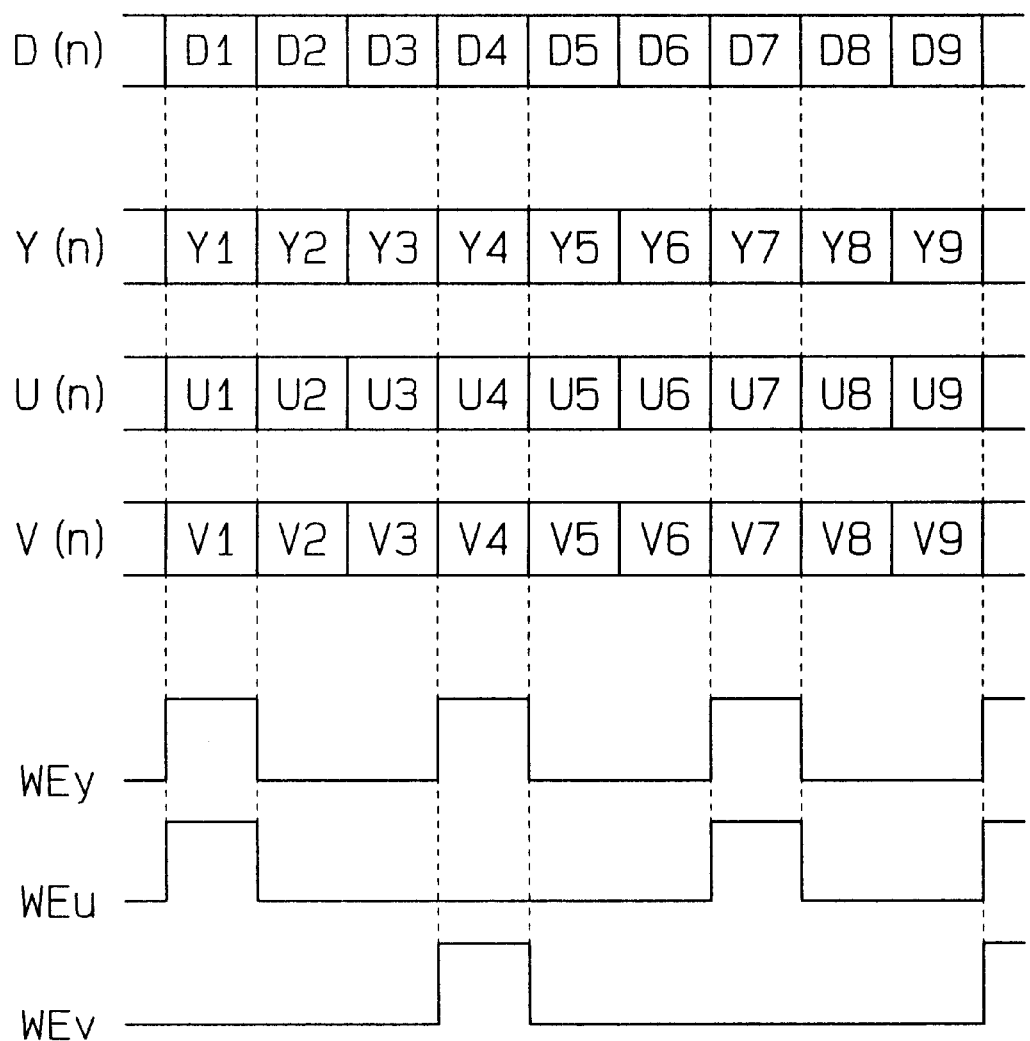

IMAGE SENSING SYSTEM EQUIPPED WITH INTERFACE BETWEEN IMAGE SENSING APPARATUS AND COMPUTER MACHINERY

BACKGROUND OF THE INVENTION

1. Field of the Invention

The present invention relates generally to an image sensing system, and more particularly, to an image sensing system equipped with an interface between an image sensing apparatus, which generates image data, and a computer machinery which then receives the image data.

2. Description of the Related Art

To enter image data into a computer machinery (such as personal computers and word processors), an image sensing apparatus is connected to the computer machinery. As an example, the image sensing apparatus can be an image scanner or a video camera. In the case of an image scanner, the surface of a target original text is scanned to obtain image data. In many cases, the image sensing apparatus is equipped with a CCD (Charge Coupled Device) solid state image sensing device having a plurality of light-receiving pixels to receive moving pictures. The image sensing apparatus and the computer machinery are connected by an expansion circuit board called "video capture unit". This video capture unit converts image data output from the image sensing apparatus to data which is suitable for use in the computer machinery. The converted data is stored in a memory incorporated in the computer machinery.

As shown in FIG. 1, a video capture unit 110 is provided between an image sensing apparatus 100 and a personal computer 120. The video capture unit 110 has an A/D converter 111, a frame memory 112, a sync detector 113, a timing controller 114, and an interface circuit 115.

The A/D converter 111 executes analog-to-digital conversion on analog image signal Y1(t) from the image sensing apparatus 100 in synchronism with the signal output operation of the CCD to thereby produce digital image data. This digital image data is produced for each light-receiving pixel of the CCD. The frame memory 112 stores the image data from the A/D converter 111 screen by screen. A dual port type RAM capable of accomplishing simultaneous writing and reading of image data is used for this frame memory 112. The sync detector 113 detects a sync signal included in the image signal Y1(t) from the image sensing apparatus 100 and produces a timing pulse signal associated with vertical scanning and horizontal scanning.

The timing controller 114 receives the timing pulse signal from the sync detector 113 and a read instruction signal, which is supplied from the personal computer 120 via the interface circuit 115. The timing controller 114 sends a control signal to the A/D converter 111 in response to the timing pulse signal. The A/D converter 111 operates in synchronism with the CCD in accordance with the control signal. Under this control, the A/D converter 111 converts the image signal Y1(t), supplied from the image sensing 100, to digital image data pixel by pixel.

In accordance with the timing pulse signal and the read instruction signal, the timing controller 114 supplies write and read timing control signals for image data to the frame memory 112. The timing controller 114 supplies a transfer instruction signal to the interface circuit 115 to instruct the transfer of the image data from the frame memory 112 to the personal computer 120. At the same time, the image data is stored in the frame memory 112 screen by screen, the interface circuit 115 reads image data from the frame memory 112 screen by screen and transfers the image data to the personal computer 120. The timing controller 114 sends an interruption signal to the interface circuit 115, which in turn sends the interruption signal to the personal computer 120.

The personal computer 120 repeats data processing such as receiving of image data, various arithmetic operations, access to a frame memory, and screen display control in a time-sharing manner in accordance with a command supplied through the keyboard and a command issued by the operation program. It is difficult for the personal computer 120, which performs such complicated processing, to continuously and rapidly receive image data in response to the operation of the image sensing apparatus 100. Image sensing apparatuses which conform to the general television forms, such as the NTSC standards and PAL standards, output several tens of frames of image data per second. Ordinary personal computers can however receive only several frames of image data per second.

The video capture unit 110 controls writing of data to the frame memory 112 in such a manner that a part of image data is read from the frame memory 112 and is transferred to the personal computer 120. For this writing control, the video capture unit 110 requires the A/D converter 111 to be fast and the frame memory 112 to have a large capacity. This requirement inevitably increases the cost of the video capture unit 110 and eventually increases the cost of the image sensing system which uses the video capture unit 110.

To improve operation and reduce the cost of such an image sensing system, the operation of the image sensing apparatus may be designed to match the operation of a computer machinery. For example, Japanese Patent Laid Open No. 7-87404 discloses an image sensing system which is designed so that the individual operation timings of an image sensing apparatus associated with the vertical and horizontal scans are controlled by a computer machinery. This image sensing system can directly supply image data to a computer machinery from the image sensing device without using any video capture unit. However, this design puts a large load on the computer machinery which controls the operation timings of the image sensing apparatus, thus making it difficult to increase the transfer speed of image data.

SUMMARY OF THE INVENTION

Broadly speaking, the present invention relates to an image sensing system designed to not only improve performance (e.g., transfer speed of image data) but also contribute to reducing the cost which is associated with the connection between a computer machinery and an image sensing apparatus.

The present invention can be implemented in numerous ways including as a system, an apparatus and a method. Several embodiments of the invention are detailed below.

As an image sensing system suitable for interfacing with a computer machinery, an embodiment of the invention includes: a solid state image sensing device having a plurality of light-receiving pixels for receiving light reflected from a target object to produce information charges and retain the information charges, the plurality of light-receiving pixels being arranged in a matrix form; a driver for driving the solid state image sensing device in accordance with vertical and horizontal scan timings to cause the solid state image sensing device to produce an analog image signal in proportion to an amount of the information charges retained in the light-receiving pixels and output the analog image signal line by line; a timing controller, connected to the driver, for setting the vertical and horizontal scan timings of the solid state image sensing device to be driven by the driver; an analog signal processor, connected to the solid state image sensing device, for performing signal processing on the analog image signal to produce a signal-processed analog image signal; an A/D converter, connected to the analog signal processor, for performing analog-to-digital conversion on the signal-processed analog image signal to produce a digital image signal; a digital signal processor, connected to the A/D converter, for performing signal processing on the digital image signal to produce image data for each pixel; a line memory circuit, connected to the digital signal processor, for continuously storing the image data; and an interface controller, connected to the line memory circuit, for reading the image data from the line memory circuit and outputting the image data. Preferably, the solid state image sensing device, the driver, the analog signal processor and the A/D converter constitute a camera unit, and the digital signal processor, the line memory circuit and the interface controller are incorporated in the computer machinery in such a way as to be connectable to the camera unit.

As an image sensing system suitable for interfacing with a computer machinery, another embodiment of the invention includes: a solid state image sensing device having a plurality of light-receiving pixels for receiving light reflected from a target object to produce information charges and retain the information charges, the plurality of light-receiving pixels being arranged in a matrix form; a driver for driving the solid state image sensing device in accordance with vertical and horizontal scan timings to cause the solid state image sensing device to produce an analog image signal in proportion to an amount of the information charges retained in the light-receiving pixels and output the analog image signal line by line; a timing controller, connected to the driver, for setting the vertical scan timing of the solid state image sensing device to be driven by the driver in accordance with a given period and for setting the horizontal scan timing of the solid state image sensing device in response to a line feed trigger supplied from the computer machinery; an analog signal processor, connected to the solid state image sensing device, for performing signal processing on the analog image signal to produce a signal-processed analog image signal; an A/D converter, connected to the analog signal processor, for performing analog-to-digital conversion on the signal-processed analog signal data to produce digital image signal; a digital signal processor, connected to the A/D converter, for performing signal processing on the digital image signal to produce image data for each pixel; a line memory circuit, connected to the digital signal processor, for continuously storing the image data line by line; and an interface controller, connected to the line memory circuit, for reading the image data from the line memory circuit and outputting the image data.

As an image sensing system suitable for interfacing with a computer machinery, yet another embodiment of the invention includes: a solid state image sensing device having a plurality of light-receiving pixels for receiving light reflected from a target object to produce information charges and retain the information charges, the plurality of light-receiving pixels being arranged in a matrix form; a driver for driving the solid state image sensing device in accordance with vertical and horizontal scan timings to cause the solid state image sensing device to produce an analog image signal in proportion to an amount of the information charges retained in the light-receiving pixels and output the analog image signal; a timing controller, connected to the driver, for setting the vertical and horizontal scan timings of the solid state image sensing device to be driven by the driver; an analog signal processor, connected to the solid state image sensing device, for performing signal processing on the analog image signal to produce a signal-processed analog image signal; an A/D converter, connected to the analog signal processor, for performing analog-to-digital conversion on the signal-processed analog image signal to produce a digital image signal; a digital signal processor, connected to the A/D converter, for performing signal processing on the digital image signal to produce image data for each pixel; a line memory circuit, connected to the digital signal processor, for continuously storing the image data line by line; a memory controller, connected to the line memory circuit, for controlling the line memory circuit in such a manner that the image data is written in the line memory circuit at a timing synchronous with the signal processing of the digital signal processor and the image data is read from the line memory circuit in accordance with a predetermined timing; and an interface controller, connected to the line memory circuit, for receiving the image data read from the line memory circuit and outputting the received image data.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the invention together with the accompanying drawings, in which:

FIGS. 2 through 8B illustrate the first embodiment of the invention;

FIG. 2 is a block diagram of an image sensing system;

FIG. 3 is a block diagram showing a CCD solid state image sensing device and a driver, both incorporated in a camera unit included in the image sensing system;

FIG. 4 is a timing chart illustrating the operation of the camera unit;

FIG. 5 is a plan view depicting a color filter attached to the CCD solid state image sensing device;

FIG. 6A is a diagram showing the arrangement of color components in an odd-numbered line of image data output from the solid state image sensing device to which the color filter is attached;

FIG. 6B is a diagram showing the arrangement of color components in an even-numbered line of image data output from the solid state image sensing device to which the color filter is attached;

FIG. 7 is a block diagram illustrating a digital signal processor in a second control unit provided in a personal computer;

FIG. 8A is a diagram showing the arrangement of color components in first to third image data output from a line memory in the digital signal processor at the time of reading an odd-numbered line of image data;

FIG. 8B is a diagram showing the arrangement of color components in first to third image data output from a line memory in the digital signal processor at the time of reading an even-numbered line of image data;

FIG. 10 is a timing chart illustrating the operation of a camera unit included in the image sensing system according to the second embodiment;

FIG. 11 is a block diagram illustrating an image sensing system according to the third embodiment of the invention; and FIG. 12 is a timing chart illustrating the operation of a memory controller which controls writing of image data to a line memory.

DETAILED DESCRIPTION OF THE PREFERRED EMBODIMENTS

First Embodiment

Figure 1:
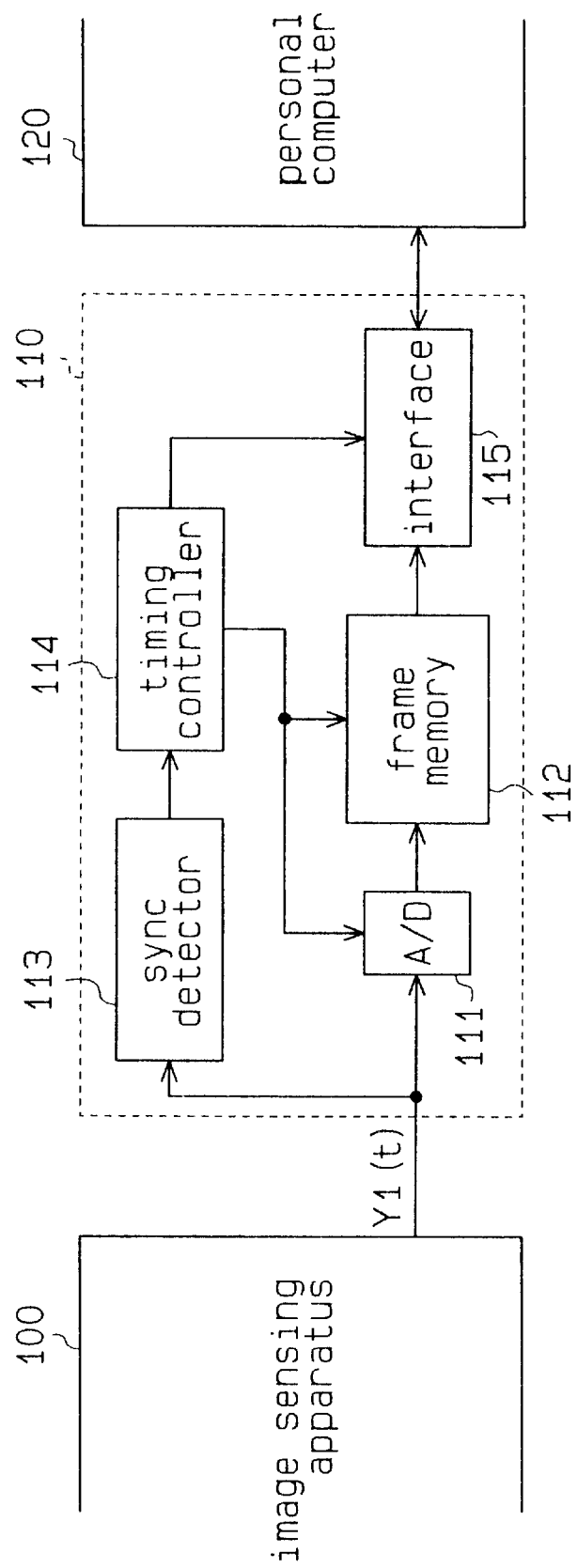
FIG. 1 is a block diagram illustrating a conventional video capture unit connected between an image sensing apparatus and a computer machinery.
Figure 2:
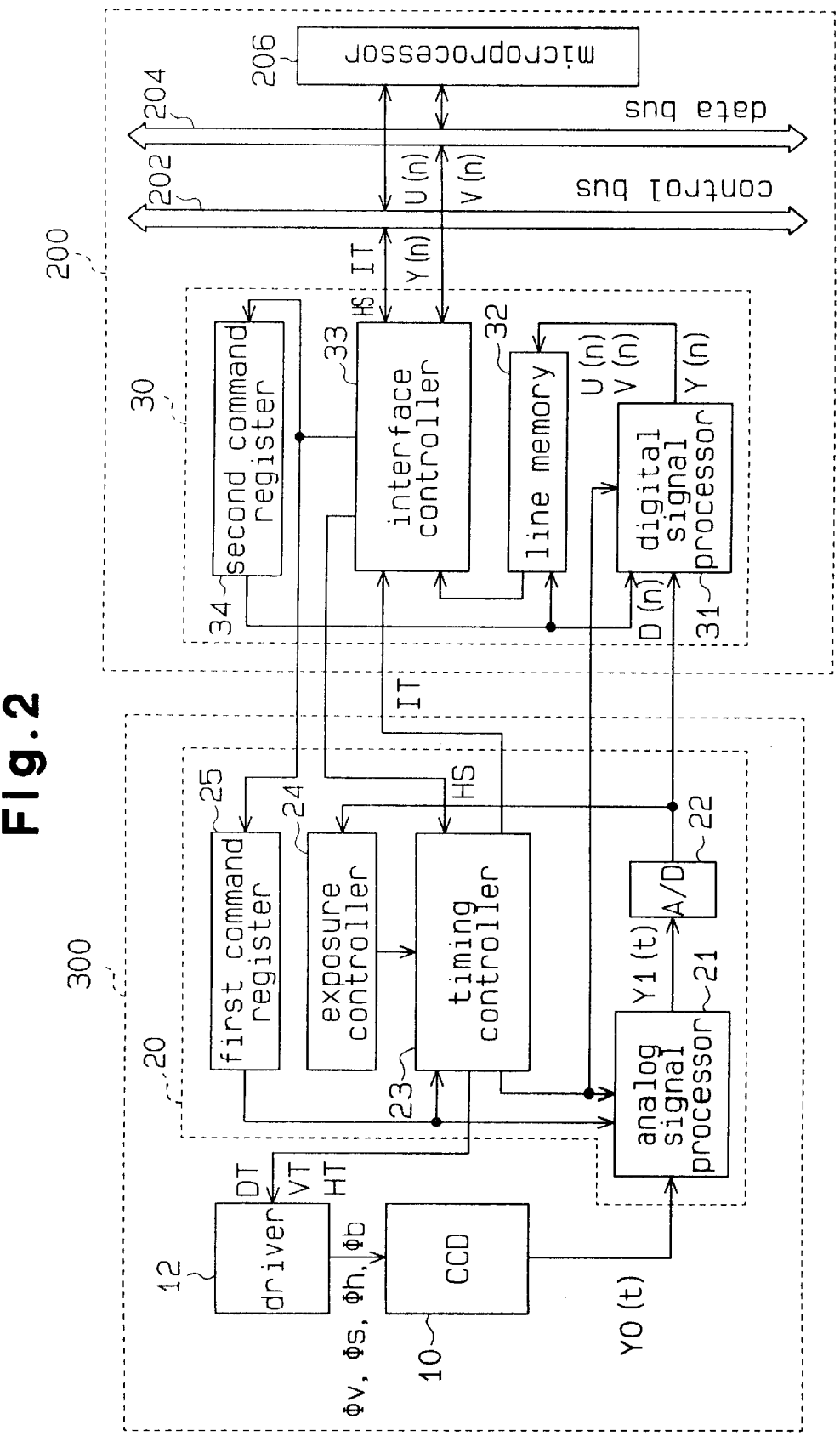

An image sensing system according to the first embodiment of the present invention will now be described referring to the accompanying drawings. As shown in FIG. 2, the image sensing system according to the first embodiment has a camera unit 300 connected to a personal computer 200. The camera unit 300 includes a CCD solid state image sensing device (hereinafter simply referred to as "CCD") 10 of the frame transfer type, a driver 12 and a first control unit 20. The personal computer 200 includes a microprocessor 206, a control bus 202, a data bus 204 and a second control unit 30 which is connected to the control bus 202 and data bus 204. In one embodiment, the CCD 10, the driver 12 and the first and second control units 20 and 30 are integrated in separated IC chips. The CCD 10, the driver 12 and the first and second control units 20 and 30 constitute an image sensing apparatus.

Figure 3:
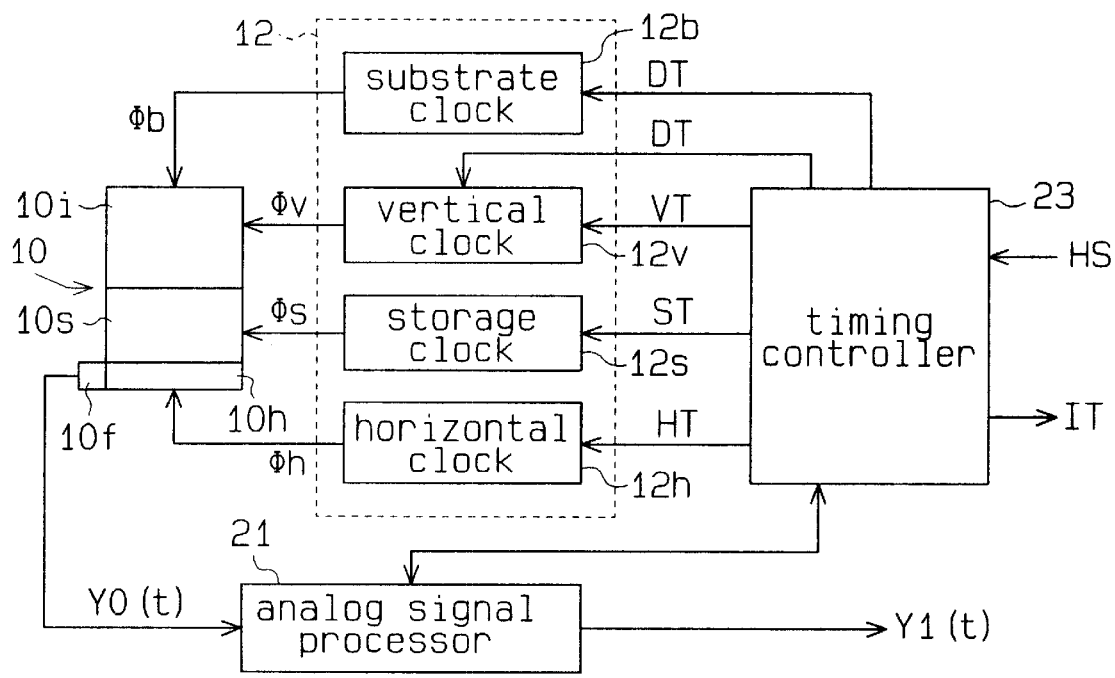

As shown in FIG. 3, the CCD 10 of the frame transfer type includes a light-receiving section 10$i$, a storage section 10$s$, a horizontal transfer section 10$h$, and an output section 10$f$. The light-receiving section 10$i$ is comprised of a plurality of shift registers connected in parallel in the horizontal direction and aligned in series in the vertical direction. The individual bits of those shift registers form a plurality of light-receiving pixels which store (accumulate) information charges that are produced in accordance with the reflected light from a target object to be sensed. The storage section 10$s$ is comprised of a series of shift registers associated with the shift registers of the light-receiving section 10$i$. The number of bits of each shift register of the storage section 10$s$ is set to match with the number of bits of each shift register of the light-receiving section 10$i$. The storage section 10$s$ thus temporarily stores one screen of information charge packets transferred from the light-receiving section 10$i$.

The horizontal transfer section 10$h$ is comprised of a single shift register which has a plurality of bits respectively connected to the outputs of the plurality of shift registers of the storage section 10$s$. The horizontal transfer section 10$h$ receives one screen of information charge packets stored in the storage section 10$s$ on a line-by-line basis, and sequentially outputs the information charge packets to the output section 10$f$. The output section 10$f$ includes an electrically isolated capacitor which receives information charge packets from the horizontal transfer section 10$h$ pixel by pixel, and an amplifier which detects a change in the potential of the capacitor to produce a voltage-value signal or analog image signal Y0(t).

Figure 4:
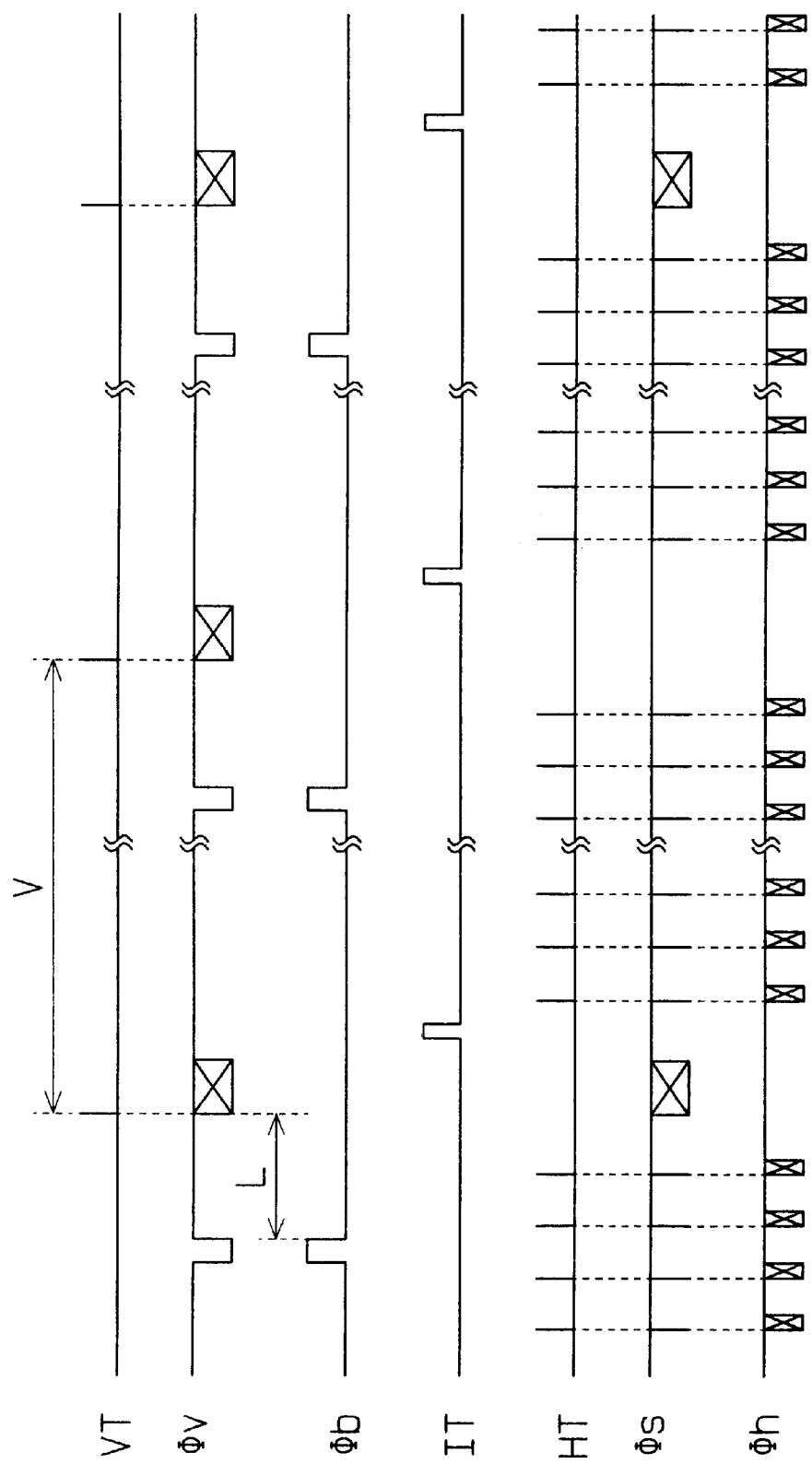

The driver 12 includes a vertical clock generator 12$v$, a storage clock generator 12$s$, a horizontal clock generator 12$h$ and a substrate clock generator 12$b$. Refer to FIGS. 3 and 4 with respect to the following description. The vertical clock generator 12$v$ generates a vertical clock signal Øv in response to a vertical timing signal VT from a timing controller 23 and supplies this clock signal to the light-receiving section 10$i$. The light-receiving section 10$i$ transfers information charge packets to the storage section 10$s$ in response to the vertical clock signal Øv. The storage clock generator 12$s$ generates a storage clock signal Øs in response to a storage timing signal ST from the timing controller 23 and supplies this clock signal to the storage section 10$s$. In response to the storage clock signal Øs, the storage section 10$s$ receives information charge packets from the light-receiving section 10$i$ and transfers one screen of received information charge packets to the horizontal transfer section 10$h$ line by line.

The horizontal clock generator 12$h$ generates a horizontal clock signal Øh in response to a horizontal timing signal HT from the timing controller 23 and supplies this clock signal to the horizontal transfer section 10$h$. In response to the horizontal clock signal Øh, the horizontal transfer section 10$h$ receives one line of information charge packets transferred from the storage section 10$s$ and sequentially transfers the information charge packets to the output section 10$f$. The output section 10$f$ supplies analog image signal Y0(t) as the output of the CCD 10 to an analog signal processor 21.

In response to a discharge timing signal DT from the timing controller 23, the substrate clock generator 12$b$ produces a substrate clock signal Øb and supplies the clock signal to the drain region (not shown) in the light-receiving section 10$i$. The discharge timing signal DT serves to determine the timing for discharging charges from the CCD 10. The light-receiving section 10$i$ discharges the stored information charges in response to the substrate clock signal Øb.

As shown in FIG. 4, therefore, the storage time for information charges in the light-receiving section 10$i$ is indicated by a period L which extends from the completion of the information-charge discharging operation by the substrate clock signal Øb to the start of the information-charge transfer operation by the vertical clock signal Øv. Changing the timing for supplying this substrate clock signal Øb permits the storage period for information charges or the shutter speed to be controlled. In other words, the period L is variably set so that the CCD 10 is always kept under the proper exposure conditions. Japanese Patent Laid Open No. 3-22768 and Japanese Patent Laid Open No. 3-48586 disclose methods of discharging information charges.

Referring again to FIG. 2, the first control unit 20 includes the aforementioned analog signal processor 21, an A/D converter 22, the aforementioned timing controller 23, an exposure controller 24, and a first command register 25.

The analog signal processor 21 receives analog image signal Y0(t) from the CCD 10 and performs signal processing, such as sample and hold processing and AGC (Automatic Gain Control) processing, to produce wave-shaped analog image signal Y1(t). The analog image signal Y0(t) has a discharged potential and a signal potential which are alternately repeated in synchronism with the output operation of the CCD 10. In the sample and hold processing, for example, the reference (or discharged) potential and signal potential of the analog image signal Y0(t) are sampled and a difference between both potentials is acquired. In the AGC processing, a gain corresponding to the average level of image data in one vertical scan period is given to the sampled and held image data. Accordingly, the average level of image data in each vertical scan period becomes substantially uniform.

The A/D converter 22 converts the image signal Y1(t) from the analog signal processor 21 to digital image data D(n) in synchronism with the output operation of the CCD 10. This digital image data D(n) is transferred to the second control unit 30 in the personal computer 200.

The timing controller 23 generates the vertical timing signal VT in accordance with a reference clock signal having a given period and supplies this timing signal VT to the vertical clock generator 12v of the driver 12. As shown in FIG. 4, the pulse period V of the vertical timing signal VT corresponds to the period of the vertical scanning of the CCD 10. This pulse period V is set to a time duration sufficient to transfer one screen of image data D(n) to the personal computer 200 in accordance with a command stored in the first command register 25. At the same time as the supply of the vertical timing signal VT, the timing controller 23 supplies an interruption signal IT, which indicates that the CCD 10 can output one screen of information charges, to the second control unit 30. The vertical scan timing of the CCD 10 is determined by the timing controller 23 in this manner.

The timing controller 23 also generates the horizontal timing signal HT in response to a line feed trigger HS which is supplied via the second control unit 30 from the microprocessor 206, and sends this signal HT to the horizontal clock generator 12h in the driver 12. The horizontal scan timing of the CCD 10 is therefore determined by the personal computer 200. The timing controller 23 generates the storage timing signal ST in response to the reference clock signal and the line feed trigger HS, and supplies the storage timing signal ST to the storage clock generator 12s in the driver 12.

The exposure controller 24 integrates the digital image data D(n) from the A/D converter 22 screen by screen and supplies the value of the acquired integral as exposure data to the timing controller 23. This exposure controller 24 may alternatively acquire the integral value from the analog image signal Y1(t) output from the analog signal processor 21. The timing controller 23 produces the discharge timing signal DT in response to the exposure data from the exposure controller 23, and supplies the discharge timing signal DT to the substrate clock generator 12b and the vertical clock generator 12v in the driver 12. Accordingly, the storage period for information charges in the CCD 10 is controlled to be extended or shortened based on the exposure data.

Stored in the first command register 25 are various commands supplied from the second control unit 30 (microprocessor 206). The various commands include the command which designates the vertical scan period of the CCD 10 or the output period of one screen of image data D(n) in accordance with the performance of the microprocessor 206 to receive the image data D(n). The timing controller 23 receives various commands from the first command register 25, based on which the timing controller 23 determines the self operation cycle and controls the analog signal processor 21 and a digital signal processor 31 so that the operation cycles of those signal processors 21 and 31 become the same as the operation cycle of the CCD 10. The analog signal processor 21 receives various commands from the first command register 25 based on which it determines the conditions for processing the image signal.

The second control unit 30 includes the aforementioned digital signal processor 31, a line memory 32, an interface controller 33 and a second command register 34. The digital signal processor 31 performs digital processing, such as the color separation, a matrix operation and white balance adjustment, on the digital image data D(n) produced by the first control unit 20, to produce image data which consists of luminance data Y(n) and color difference data U(n) and V(n). In the color matrix operation, for example, individual color components obtained by the color separation are synthesized to produce the luminance data Y(n). Further, the individual color components are subjected to subtraction or addition to produce color component data R(n), G(n) and B(n) corresponding to predetermined color components (R, G and B). The color difference data U(n) and V(n) are acquired by computing the differences between the color component data R(n) and B(n) and the luminance data Y(n). Alternatively, the digital signal processor 31 may directly output the color component data R(n), G(n) and B(n).

The line memory 32 stores one line of image data (luminance data Y(n) and color difference data U(n) and V(n)) or color component data R(n), G(n) and B(n) supplied from the digital signal processor 31. This line memory 32 may be comprised of a FIFO (First-In-First-Out) type buffer. The line memory 32 receives commands stored in the second command register 34 which will be discussed later, and performs data writing and reading based on those commands. That is, the data write timing is so controlled as to be synchronized with the processing operation of the digital signal processor 31 while the read timing is so controlled as to be synchronized with the data latching frequency of the microprocessor 206.

The line memory 32 has a predetermined number of bits that are set according to the data outputting system. The ordinary data formats which personal computers can receive are (1) the 16-bit structure (8-bit luminance data Y(n) and 8-bit color difference data U(n) and V(n) which are acquired in the time-sharing manner) and (2) the 15-bit structure (color component data R(n), G(n) and B(n) each consisting of five bits). The number of bits of the line memory 32 in the first embodiment is 16 bits. Personal computers can use a part of the luminance data Y(n) and color difference data U(n) and V(n). With regard to such a personal computer which uses partial data, the amount of data can be reduced by thinning the luminance data Y(n) and the color difference data U(n) and V(n) pixel by pixel or line by line at the time data is written in the line memory 32.

The interface controller 33 reads one line of image data (luminance data Y(n) and color difference data U(n) and V(n)) from the line memory 32 in the period according to the latch frequency of the microprocessor 206 and sends the image data onto the data bus 204. Simultaneously, the interface controller 33 receives the interruption signal IT supplied from the first control unit 20 of the camera unit 300 and sends this signal IT to the control bus 202. The interface controller 33 receives the line feed trigger HS supplied from the microprocessor 206 via the control bus 202 and sends this signal to the timing controller 23 of the first control unit 20. The interface controller 33 receives various kinds of commands supplied via the control bus 202 from the microprocessor 206 and sends those commands to the first command register 25 and the second command register 34. The second command register 34, like the first command register 25, stores the commands from the interface controller 33. The line memory 32 determines the writing cycle based on those commands. The digital signal processor 31 receives the commands from the second command register 34 and determines the conditions for processing image data. The frequency of transfers of those commands to the first and second command registers 25 and 34 from the personal computer 200 is relatively slow. In this respect, those commands may be transferred in the time-divisional manner to the camera unit 300 from the personal computer 200 using the transfer line for the image data D(n).

The second control unit 30 is connected to the first control unit 20 by a predetermined connection cable (link). This connection cable is used to transfer the image data D(n), which has undergone the analog signal processing for analog/digital conversion, and the timing signals (the line feed trigger HS, interruption signal IT and various kinds of commands). This permits the connection cable to have fewer lines than the connection cable that transfers the image data (luminance data Y(n) and color difference data U(n) and V(n)) or color component data R(n), G(n) and B(n) which has undergone the digital signal processing. In other words, the provision of the digital signal processor 31 into the personal computer 200 allows fewer bits of image data to be supplied to the personal computer 200 from the camera unit 300. Consequently, the connection cable between the camera unit 300 and the personal computer 200 is simplified.

According to the first embodiment of the invention, as discussed above, the first control unit 20 of the camera unit 300 performs analog signal processing of image data and the second control unit 30 of the personal computer 200 performs digital signal processing of image data. This permits simplified connection between the camera unit 300 and the personal computer 200, which results in the reduction in the cost associated with the connection between a computer machinery and an image sensing apparatus. In other words, the interface between the camera unit and computer machinery can be accomplished without using a large-capacity frame memory, thus simplifying the connection between the camera unit and computer machinery.

As the image sensing apparatus is preferably constituted of four IC chips which respectively are the CCD 10, the driver 12 and the first and second control units 20 and 30, further cost reduction is possible. Moreover, the digitalization of the connection cable (link) between the camera unit 300 and the personal computer 200 prevents the S/N ratio from being degraded by noise which has entered the transfer path.

Figures 5, 6A, 6B:
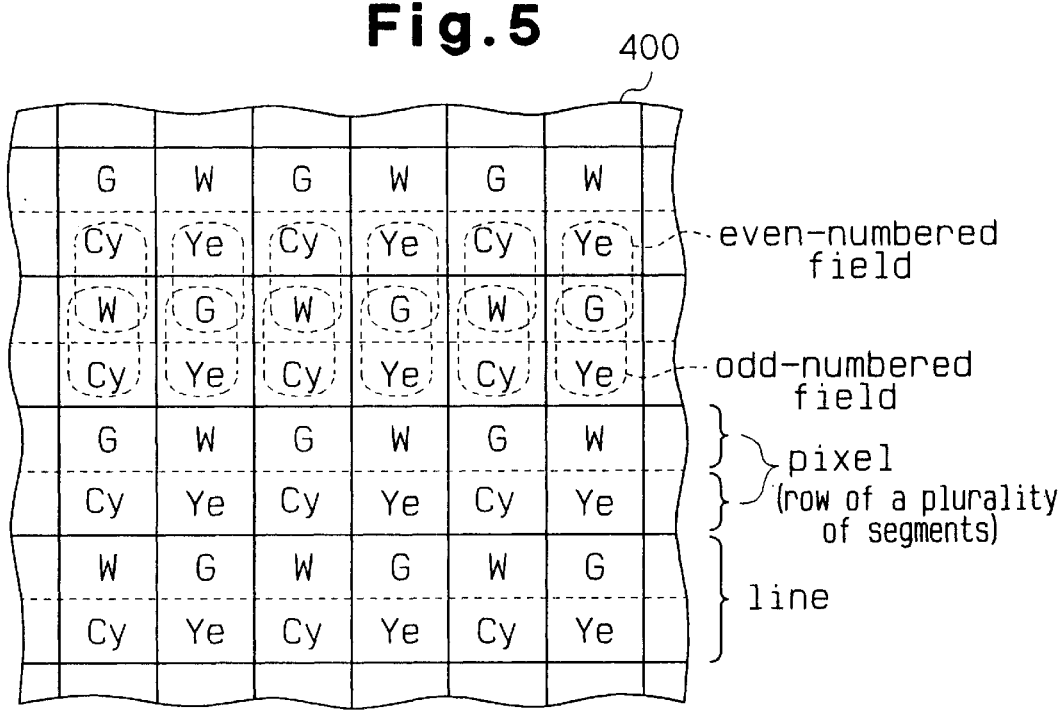

FIG. 5 is a plan view showing a mosaic type color filter 400 attached to the light-receiving section 10i of the CCD 10. The color filter 400 has a plurality of segments corresponding to the individual pixels of the light-receiving section 10i and a group of color components, for example, Ye (yellow), Cy (cyan), W (white) and G (green), is assigned to each segment. According to the first embodiment, W and G components are alternately assigned to odd rows of a plurality of segments, Ye and Cy components are alternately assigned to even rows of the plurality of segments. In reading data from the CCD 10, two pieces of image data adjoining in the vertical direction are mixed. When a first line of data consisting of two adjacent pixels associated with a first odd and a first even row of the plurality of segments is read, G+Cy and W+Ye image data D(n) are alternately obtained as shown in FIG. 6A. When a subsequent second line of data consisting of two adjacent pixels associated with a second odd and a second even row of the plurality of segments is read, W+Cy and G+Ye image data D(n) are alternately acquired as shown in FIG. 6B. In the case where image data is acquired from the CCD 10 by interlace driving, odd-numbered fields and even-numbered fields are so set as to share one line of pixels as indicated by the broken lines in FIG. 5. In this case, the constituting ratio of the individual color components of the mixed image data obtained from the odd-numbered field matches with the constituting ratio of those from the even-numbered field.

Figures 7, 8A, 8B:
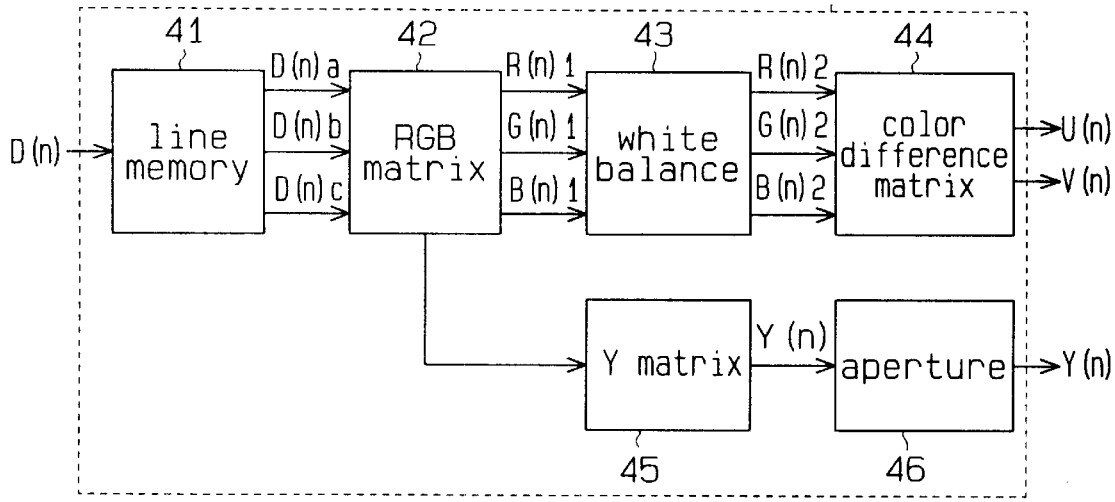

As shown in FIG. 7, the digital signal processor 31 includes a digital processing line memory 41, an RGB matrix circuit 42, a white balance controller 43, a color difference matrix circuit 44, a Y matrix circuit 45 and an aperture circuit 46. The digital processing line memory 41 consists of at least three internal line memories (not shown) connected in series and makes parallel output of three lines of first to third image data D(n)a, D(n)b and D(n)c which are stored consecutively line by line in the respective internal line memories. The first to third image data D(n)a, D(n)b and D(n)c are output in such a way that predetermined color components flow consecutively as described below in connection with the color filter 400. In the case of the CCD color filter 400 shown in FIG. 5, for example, when an odd-numbered line of image data D(n) is read, the second image data D(n)b is output so that the W+Cy component and G+Ye component are alternately repeated and the first and third image data D(n)a and D(n)c are output so that the G+Cy component and W+Ye component are alternately repeated, as shown in FIG. 8A. When an even-numbered line of image data D(n) is read, the second image data D(n)b is output so that the G+Cy component and W+Ye component are alternately repeated and the first and third image data D(n)a and D(n)c are output so that the W+Cy component and G+Ye component are alternately repeated, as shown in FIG. 8B. In this case, each line of image data consists of two adjacent pixels associated with an odd and even row of the plurality of segments.

The RGB matrix circuit 42 performs addition or subtraction on the first to third image data D(n)a, D(n)b and D(n)c from the digital line memory 41 to produce color component data R(n), G(n) and B(n) corresponding to the three primary colors (R: red, G: green and B: blue). Based on the first to third image data D(n)a, D(n)b and D(n)c, the difference between W+Ye and G+Cy is computed to produce the R component and the difference between W+Cy and G+Ye is computed to produce the B component. The G component is acquired by subtracting the B component from G+Cy or subtracting the R component from G+Ye. At this time, the R component and B components are alternately produced from an odd-numbered line of image data and an even-numbered line of image data. Using this processing, the interpolation of the color component data is performed. More specifically, when one of the R component and B component is acquired from the second image data D(n)b of the target line, the average of the other component obtained from the first image data D(n)a preceding the target line and the other component obtained from the third image data D(n)c following the target line is computed. This average value is used in the interpolation of the color component data.

When an odd-numbered line of image data is read, the B component data B(n) is produced from the second image data D(n)b according to the following equation 1, and the R component data R(n) is produced from the first and third image data D(n)a and D(n)c according to the following equation 2.

$$B(n) = |D(n)b - D(n+1)b| \quad (1)$$
$$= [W+Cy]b - [G+Ye]b$$
$$= [2B]$$

$$R(n) = |D(n)a - D(n+1)a| + |D(n)c - D(n+1)c|)/2 \quad (2)$$
$$= ([W+Ye]a - [G+Cy]a + [W+Ye]c - [G+Cy]c)/2$$
$$= [2R]$$

Further, the first to third image data D(n)a, D(n)b and D(n)c and the R and B component data R(n) and B(n) acquired from the equations 1 and 2 are used to produce the G component data G(n) from the following equation 3.

$$G(n) = (D(m)b - R(m)/2 + D(m \pm 1)a + \qquad (3)$$
$$D(m \pm 1)c - B(m \pm 1))/3$$
$$= ([G + Ye]b - [R] + [G + Cy]a + [G + Cy]c - [2B])/3$$
$$= [2G] \quad \text{(m: even number)}$$

When an even-numbered line of image data is read, the R component data R(n) is produced from the second image data D(n)b according to the following equation 4, and the B component data B(n) is produced from the first and third image data D(n)a and D(n)c according to the following equation 5.

$$R(n) = |D(n)b - D(n+1)b| \qquad (4)$$
$$= [W + Ye]b - [G + Cy]b$$
$$= [2R]$$

$$B(n) = |D(n)a - D(n+1)a| + |D(n)c - D(n+1)c|)/2 \qquad (5)$$
$$= ([W + Cy]a - [G + Ye]a + [W + Cy]c - [G + Ye]c)/2$$
$$= [2B]$$

Further, the G component data G(n) is produced from the following equation 6 using the first to third image data D(n)a, D(n)b and D(n)c and the R and B component data R(n) and B(n) acquired from the equations 4 and 5.

$$G(n) = (D(m \pm 1)b - B(m \pm 1)/2 + D(m)a + \qquad (6)$$
$$D(m)c - R(m)c)/3$$
$$= ([G + Cy]b - [B] + [G + Ye]a + [G + Ye]c - [2R])/3$$
$$= [2G]$$

The RGB matrix circuit 42 executes the above operations to produce the individual color component data R(n), G(n) and B(n). The above-described operations permit the center-of-gravity positions of the individual color component data to coincide with one another.

The white balance controller 43 multiplies the individual color component data R(n), G(n) and B(n) by their respective specific gain coefficients. Consequently, the balance of the color component data R(n), G(n) and B(n) is adjusted to improve the color reproducibility on the reproduction screen. When the illumination on the target object changes or the light sensitivity varies depending on the color components, the color of the target object may not be reproduced accurately on the reproduction screen. To prevent such an event so that a white target object is displayed as white as the original white on the reproduction screen, the white balance controller 43 adjusts the gain coefficients by which the individual color component data R(n), G(n) and B(n) are multiplied. Normally, this white balance controller 43 executes feedback control so that the integral values of the individual color component data R(n), G(n) and B(n) converge to predetermined values screen by screen or in the units of several screens.

The color difference matrix circuit 44 combines the individual color component data R(n), G(n) and B(n) at the ratio of 3:6:1 to yield combined value data. The color difference matrix circuit 44 subtracts the combined value data from the R and B component data R(n) and B(n) to produce color difference data U(n) and V(n) corresponding to the color difference signals R-Y and B-Y. This color difference matrix circuit may subtract the luminance data Y(n) generated by the Y matrix circuit 45 (to be described later) to produce the color difference data U(n) and V(n).

The Y matrix circuit 45 receives the first to third image data D(n)a, D(n)b and D(n)c from the RGB matrix circuit 42 and combines the four color components included in each image data to yield luminance data Y(n). For example, the luminance data Y(n) is produced from the following equation 7 using the second image data D(n)b for a single target pixel and the second image data D(n−1)b and D(n+1)b for the two pixels preceding to and following the target pixel.

$$Y(n) = D(n)b + (D(n-1)b + D(n+1)b)/2 \qquad (7)$$
$$= [G + Ye]b + ([W + Cy]b + [W + Cy]b)/2$$
$$= [W + Cy]b + (G + Ye]b + [G + Ye]b)/2$$
$$= [2R] + [4G] + [2B]$$

That is, directly combining the four components, Ye, Cy, G and W, yields $$Ye + Cy + G + W = (B + G) + (R + G) + G + (R + G + B)$$
$$= 2R + 4G + 2B$$

In this manner, a luminance signal having the R, G and B components combined at the ratio of 1:2:1 is acquired. According to the NTSC standards, a luminance signal should be produced by combining the R, G and B components at the ratio of 3:6:1. However, using a luminance signal having the R, G and B components combined at a ratio close to this ratio of 3:6:1 raises no practical problem. The luminance data Y(n) may be produced as follows. The Y matrix circuit 45 performs the operation according to the equation 7 on the first to third image data D(n)a, D(n)b and D(n)c to produce first to third luminance data Ya(n), Yb(n) and Yc(n) for the respective lines. The Y matrix circuit 45 further subjects the first to third luminance data Ya(n), Yb(n) and Yc(n) to the following filtering process $$Y(n) = (Y(n)a + 2Y(n)b + Y(n)c)/4$$

which is similar to the filtering process in the horizontal direction to yield the luminance data Y(n).

To enhance the outline of the image of the target object, the aperture circuit 46 enhances a specific frequency component included in the luminance data Y(n) to produce aperture data. This aperture data is added to the luminance data Y(n). More specifically, the digital image data D(n) is so filtered as to enhance the frequency component which is one fourth the sampling frequency that is used to acquire the digital image data D(n) from the analog image data Y(t). Through this filtering process, the aperture data is produced. For instance, aperture data A(n) is generated by performing the arithmetic operation, given by the following equation 8, on the luminance data Y(n).

$$A(n) = (Y(n+2) + 2Y(n) + Y(n-2)) \qquad (8)$$

As mentioned above, this aperture data A(n) is added to the luminance data Y(n) to enhance the outline of the image of the target object. In the above-described manner, the digital signal processor 31 receives the image data D(n) and outputs the luminance data Y(n) and color difference data U(n) and V(n). The digital signal processor 31 also outputs the color component data R(n), G(n) and B(n) from the white balance controller 43. Each of the luminance data Y(n) and the color difference data U(n) and V(n) consists of eight bits in conformity to the bus standards such as the ISA bus standards for personal computers. Each of the color component data R(n), G(n) and B(n) consists of five bits, or only the color component data G(n) consists of six bits while the other color component data R(n) and B(n) each consist of five bits.

Second Embodiment

Figure 9:
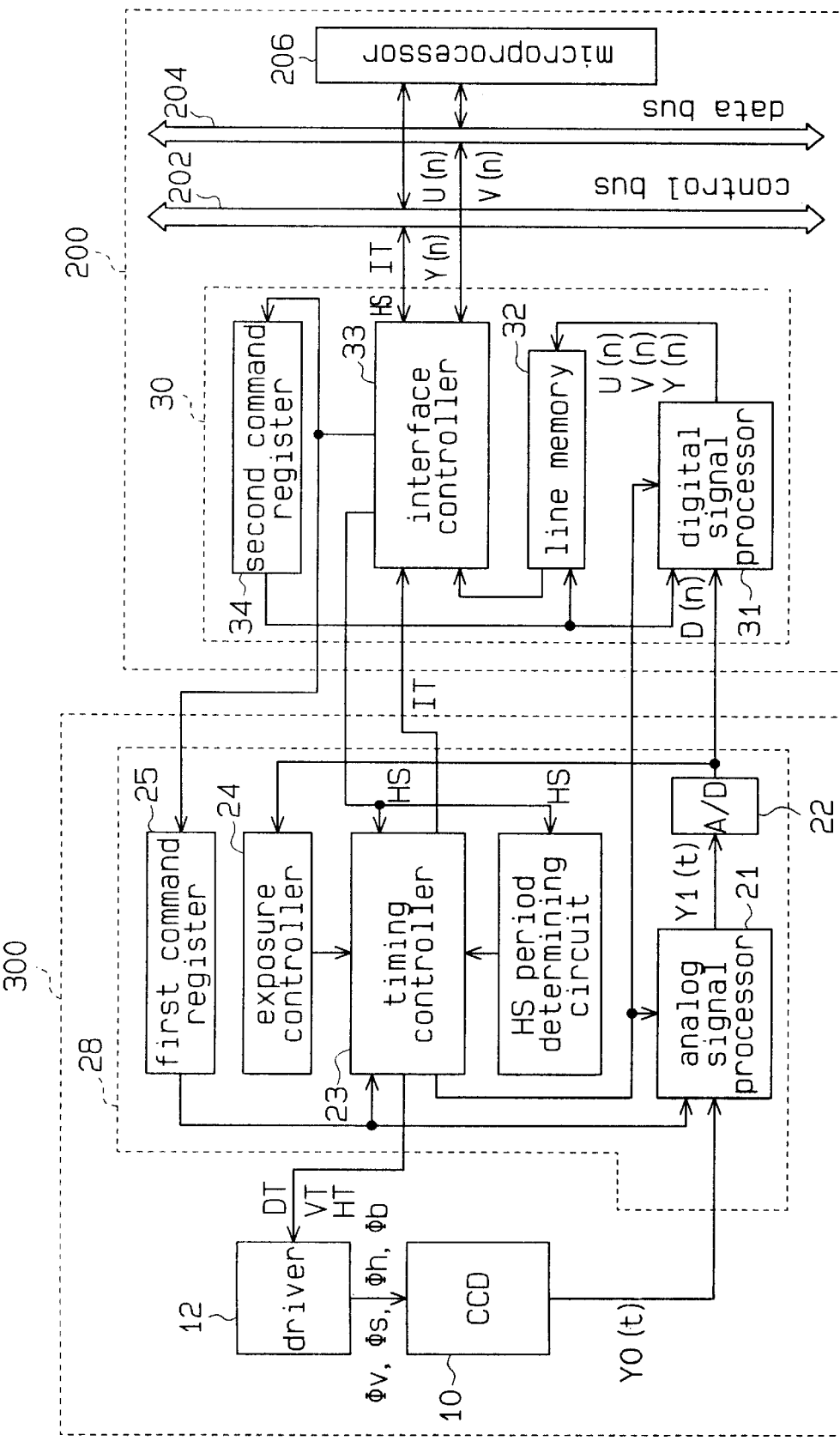
FIG. 9 is a block diagram illustrating an image sensing system according to the second embodiment of the invention.

The second embodiment will be now described with reference to FIGS. 9 and 10. To avoid a redundant description, like or same reference numerals are given to those components which are the same as the corresponding components of the first embodiment. As shown in FIG. 9, a first control unit 28 in the second embodiment includes the analog signal processor 21, the A/D converter 22, the timing controller 23, the exposure controller 24, an HS interval determining circuit 26, and the first command register 25.

The HS interval determining circuit 26 receives the line feed trigger HS supplied from the microprocessor 206 via the control bus 202 and the interface controller 33, and measures the interval of this line feed trigger HS. The HS interval determining circuit 26 compares the measured interval value with a predetermined value, and supplies a control signal to the timing controller 23 in such a manner that the timing controller 23 operates regardless of the line feed trigger HS when the measured value exceeds the predetermined value. Such a circuit is useful because the line feed trigger HS may not be output from the microprocessor 206 for a predetermined period of time for some reasons. The interruption of the supply of the line feed trigger HS disables the CCD 10 from outputting one screen of information charge packets within the activation period of the vertical scanning which has been set to a given period. When the HS interval determining circuit 26 sends out the control signal, therefore, the timing controller 23 operates to forcibly output the information charge packets from the CCD 10 irrespective of the operation of the personal computer 200.

Suppose that the line feed trigger HS has not been output from the microprocessor 206 even after the passage of a predetermined period as shown in FIG. 10. At this time, the HS interval determining circuit 26 supplies the control signal to the timing controller 23. In accordance with this control signal, the timing controller 23 supplies the horizontal timing signal HT having a given interval to the horizontal clock generator 12h regardless of the line feed trigger HS. The horizontal transfer section 10h transfers the information charge packets, stored in the storage section 10s, to the output section 10d in response to the horizontal clock signal Øh from the horizontal clock generator 12h. At this time, the timing controller 23 controls the analog signal processor 21 to be synchronous with the operation of the CCD 10 until the image data D(n) is completely output from the A/D converter 22, and controls the digital signal processor 31 such that it receives the image data D(n) being output. This control prevents information charges from remaining in the storage section 10s in the CCD 10.

According to the second embodiment, the activation timing control for the vertical scanning of the CCD 10 and the exposure control are automatically conducted by the camera unit 300. It is therefore unnecessary for the personal computer 200 to control the activation timing for the vertical scanning of the CCD 10. This design reduces the load on the personal computer 200 and can thus improve the transfer speed of image data to the personal computer 200 from the camera unit 300.

Third Embodiment

The third embodiment will be now described with reference to FIGS. 11 and 12. To avoid a redundant description, like or same reference numerals are given to those components which are the same as the corresponding components of the first embodiment. As shown in FIG. 11, a second control unit 38 includes the digital signal processor 31, the line memory 32, a memory controller 35, the interface controller 33, and the second command register 34. The line memory 32 stores one line of image data (luminance data Y(n) and color difference data U(n) and V(n)) or color component data R(n), G(n) and B(n) produced by the digital signal processor 31. This line memory 32 is comprised of a FIFO buffer which has a predetermined number of bits set according to the data outputting format.

The memory controller 35 controls the timing for writing image data into the line memory 32 in synchronism with the signal processing operation of the digital signal processor 31 (the output operation of the CCD 10) based on various kinds of commands received from the second command register 34. To reduce the amount of image data based on the commands, the memory controller 35 also controls the line memory 32 in such a manner that writing of image data is stopped at given intervals to thin a part of the image data. In other words, the various commands include a command as information associated with the given intervals at which the writing of image data should be stopped. Generally, the personal computer 200 often requires only a part of the image data. Thinning the image data to be written into the line memory 32 to meet the requirement on the personal computer 200 can ensure efficient data transfer.

For example, writing control as illustrated in FIG. 12 is performed to acquire image data whose quantity is reduced to one third. To disable the writing of two thirds of the luminance data Y(n) into the line memory 32, the memory controller 35 supplies a write enable signal WEy indicating the rising (or enabling) at an interval of two clocks to the line memory 32. To disable the writing of five sixths of the color difference data U(n) into the line memory 32, the memory controller 35 provides the line memory 32 with a write enable signal WEu, which is associated with the color difference data U(n) to be transferred in a time-sharing manner and indicates the rising (or enabling) at an interval of five clocks. To disable the writing of five sixths of the color difference data V(n) into the line memory 32, the memory controller 35 provides the line memory 32 with a write enable signal WEv, which is associated with the color difference data V(n) to be transferred in a time-sharing manner and indicates the rising (or enabling) at an interval of five clocks. The phases of the write enable signals WEu and WEv are shifted from each other by three clocks. One clock period is the operation cycle of the digital signal processor 31 and matches with the period of the horizontal clock signal Øh. Image data written in a compressed form in the line memory 32 in the above manner is read therefrom in a predetermined period corresponding to the data transfer speed of the data bus 204. In other words, the output frequency of image data can be converted to the frequency which is associated with the data transfer speed of the personal computer 200 by using the line memory 32. As a result, the efficiency of data transfer to the personal computer 200 can be improved without using a large-capacity frame memory. This feature can contribute to reducing the cost which is associated with the connection of a computer machinery to an image sensing apparatus.

The interface controller 33 receives compressed image data read from the line memory 32 on the line-by-line base and sends the image data onto the data bus 204. The interface controller 33 also receives the line feed trigger HS, supplied from the microprocessor 206 via the control bus 202, and sends it to the timing controller 23. The line feed trigger HS indicates, after having received one line of compressed image data, when the microprocessor 206 becomes ready to receive the next line of image data.

Although only three embodiments of the present invention have been described herein, it should be apparent to those skilled in the art that the present invention may be embodied in many other specific forms without departing from the spirit or scope of the invention. Particularly, it should be understood that the invention may be embodied in the following forms.

The CCD 10 may employ the interline type or the frame interline type in place of the frame transfer type. Even with the use of those two interline types, the CCD can retain one screen of information charges. The color filter shown in FIG. 5 may be replaced with a mosaic filter comprising the primary color components of R, G and B components or a stripe filter.

Therefore, the present examples and embodiments are to be considered as illustrative and not restrictive and the invention is not to be limited to the details given herein, but may be modified within the scope and equivalence of the appended claims.

What is claimed is:

1. An image sensing system suitable for interfacing with a digital processing device, comprising;
    a solid state image sensing device having a plurality of light-receiving pixels for receiving light reflected from a target object to produce information charges and retain said information charges, said plurality of light-receiving pixels being arranged in a matrix form;
    a driver for driving said solid state image sensing device in accordance with vertical and horizontal scan timings to cause said solid state image sensing device to produce an analog image signal in proportion to an amount of said information charges retained in said light-receiving pixels and output said analog image signal line by line;
    a timing controller, connected to said driver, for determining horizontal transfer timing for said solid state image sensing device to be driven by said driver in accordance with a first given period independent of said digital processing device, setting said horizontal scan timing of said solid state image sensing device in response to a line feed trigger supplied from said digital processing device, and for automatically setting said horizontal scan timing of said solid state image sensing device in accordance with a second given period when the line feed trigger has not been provided for a predetermined period of time;
    an analog signal processor, connected to said solid state image sensing device, for performing signal processing on said analog image signal to produce a signal-processed analog image signal;
    an A/D converter, connected to said analog signal processor, for performing analog-to-digital conversion on said signal-processed analog image data to produce a digital image signal;
    a digital signal processor, connected to said A/D converter, for performing signal processing on said digital image signal to produce image data for each pixel;
    a line memory circuit, connected to said digital signal processor, for continuously storing said image date; and
    an interface controller, connected to said line memory circuit, for reading said image data from said line memory circuit and outputting said image data.

2. The image sensing system according to claim 1, wherein said timing controller includes a circuit for detecting whether said line feed trigger is being supplied from said digital processing device for the predetermined period of time.

3. The image sensing system according to claim 1, wherein said timing controller includes a circuit for producing exposure data for said solid state image sensing device based on one of said signal-processed analog image signal produced by said analog signal processor and said digital image signal produced by said A/D converter, and
    said timing controller adjusts a period of retaining information charges produced by said light-receiving pixels of said solid state image sensing device in response to said exposure data.

4. An image sensing system comprising:
    a camera unit for producing an image signal, the camera unit including,
        a solid state image sensing device having a plurality of light-receiving pixels for receiving light reflected at a target object to produce information charges and retain said information charges, said plurality of light-receiving pixels being arranged in a matrix form,
        a driver for driving said solid state image sensing device in accordance with vertical and horizontal scan timings to cause said solid state image sensing device to produce an analog image signal in proportion to an amount of said information charges retained in said light-receiving pixels and output said analog image signal,
        a timing controller, connected to said driver, for setting said vertical and horizontal scan timings of said solid state image sensing device to be driven by said driver,
        an analog signal processor, connected to said solid state image sensing device, for performing signal processing on said analog image signal to produce a signal-processed analog image signal, and
        an A/D converter, connected to said analog signal processor, for performing analog-to-digital conversion on said signal-processed analog image signal to produce a digital image signal; and
    a digital processing device connected to the camera unit for receiving the image signal, the digital processing device including,
        a digital signal processor, connected to said A/D converter, for performing signal processing on said digital image signal to produce plural kinds of image data for each pixel,
        a line memory circuit, connected to said digital signal processor, for continuously storing said image data line by line,
        a memory controller, connected to said line memory circuit, for controlling said line memory circuit in such a manner that said image data is intermittently written in said line memory circuit at a timing synchronous with said signal processing of said digital signal processor to thin said image data and said thinned image data is read from said line memory circuit in accordance with a predetermined timing, wherein the memory controller controls said line memory to convert the output frequency of said image data to the frequency corresponding to a data transfer speed of the digital processing device, and an interface controller, connected to said line memory circuit, for receiving said image data read from said line memory circuit and outputting said received image data, wherein said timing controller controls said analog signal processor and said digital signal processor so that processing timings of said analog signal processor and said digital signal processor are in synchronism with said vertical scan timing of said solid state image sensing device.

5. The image sensing system according to claim 4, wherein said memory controller controls said line memory circuit selectively reduces an amount of said image data to be read from said line memory circuit.

6. The image sensing system according to claim 5, further comprising a command register for storing information concerning said predetermined intervals at which writing of said image data is to be stopped, and wherein said memory controller receives said information stored in said command register and reduces an amount of said image data to be written in said line memory circuit based on said information.

7. A method for driving a solid state imaging sensing apparatus for sensing a target object image using a solid state image sensing device and for transferring the target object image of one frame to a computer machinery line by line, wherein the solid state image sensing device has a plurality of light-receiving pixels for receiving light reflected from the target object to produce information charges and retain the information charges, the method comprising the steps of:

draining the information charges retained in each of the light-receiving pixels;

outputting the information charges retained in each of the light-receiving pixels in units of one frame;

extending or shortening the time from when the information charges are drained in the draining step to the time when the information charges are output in the outputting step in response to the quantity of information charges output from the solid state image sensing device;

repeating the draining step and the outputting step in a predetermined period; and providing the information charges corresponding to one line of one frame to the computer machinery in response to a single line feed trigger when the single line feed trigger is provided to the solid image sensing apparatus.

8. The method of claim 7, further comprising the step of providing the information charges corresponding to one line of one frame to the computer machinery when the line feed trigger has not been provided from the computer machinery even after the passage of a specified period that is shorter than the predetermined period.

9. An image sensing system suitable for interfacing with a digital processing device, comprising;

a solid state image sensing device having a plurality of light-receiving pixels for receiving light reflected from a target object to produce information charges and retain said information charges, said plurality of light-receiving pixels being arranged in a matrix form, said image sensing device providing image data line by line in response to an instruction of a computer;

a driver for driving said solid state image sensing device in accordance with vertical and horizontal scan timings to cause said solid state image sensing device to produce an analog image signal in proportion to an amount of said information charges retained in said light-receiving pixels and output said analog image signal line by line;

a timing controller, connected to said driver, for determining horizontal transfer timing in response to a line feed trigger provided from a computer, said timing controller for determining horizontal transfer timing for said solid state image sensing device to be driven by said driver in accordance with a first given period independent of said digital processing device, setting said horizontal scan timing of said solid state image sensing device in response to said line feed trigger supplied from said digital processing device, and for automatically setting said horizontal scan timing of said solid state image sensing device in accordance with a second given period when the line feed trigger has not been provided for a predetermined period of time;

an analog signal processor, connected to said solid state image sensing device, for performing signal processing on said analog image signal to produce a signal-processed analog image signal;

an A/D converter, connected to said analog signal processor, for performing analog-to-digital conversion on said signal-processed analog image data to produce a digital image signal;

a digital signal processor, connected to said A/D converter, for performing signal processing on said digital image signal to produce image data for each pixel;

a line memory circuit, connected to said digital signal processor, for continuously storing said image date, such that when an interruption instruction is received, said line memory circuit does not stop other processing to acquire image data from said image sensing device; and an interface controller, connected to said line memory circuit, for reading said image data from said line memory circuit and outputting said image data.

* * * * *

UNITED STATES PATENT AND TRADEMARK OFFICE
CERTIFICATE OF CORRECTION

PATENT NO. : 6,493,025 B1
DATED : December 10, 2002
INVENTOR(S) : Kiriyama et al.

It is certified that error appears in the above-identified patent and that said Letters Patent is hereby corrected as shown below:

<u>Title page,</u>
Item [73], should read:

-- [73]   Assignee:     Sanyo Electric Co., Ltd., Osaka (JP) --

Signed and Sealed this

Twentieth Day of May, 2003

JAMES E. ROGAN
*Director of the United States Patent and Trademark Office*